(12) United States Patent
Yuan et al.

(10) Patent No.: US 8,971,160 B1
(45) Date of Patent: Mar. 3, 2015

(54) NEAR FIELD TRANSDUCER WITH HIGH REFRACTIVE INDEX PIN FOR HEAT ASSISTED MAGNETIC RECORDING

(71) Applicant: Western Digital (Fremont), LLC, Fremont, CA (US)

(72) Inventors: Hongxing Yuan, San Ramon, CA (US); Michael V. Morelli, San Jose, CA (US); Jiangrong Cao, Fremont, CA (US); Brad V. Johnson, Santa Clara, CA (US); Rabee M. Ikkawi, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/227,340

(22) Filed: Mar. 27, 2014

Related U.S. Application Data

(60) Provisional application No. 61/918,199, filed on Dec. 19, 2013.

(51) Int. Cl.
*G11B 11/00* (2006.01)
*G11B 5/40* (2006.01)
*G11B 13/08* (2006.01)

(52) U.S. Cl.
CPC . *G11B 5/40* (2013.01); *G11B 13/08* (2013.01)
USPC .................. 369/13.33; 369/13.13; 369/13.32

(58) Field of Classification Search
CPC ............................................... G11B 2005/0024
USPC ................................. 369/13.33, 13.32, 13.13
See application file for complete search history.

(56) References Cited

U.S. PATENT DOCUMENTS

| | | | |
|---|---|---|---|
| 4,106,975 A | 8/1978 | Berkenblit et al. |
| 4,667,395 A | 5/1987 | Ahlgren et al. |
| 5,872,684 A | 2/1999 | Hadfield et al. |
| 5,940,697 A | 8/1999 | Yoo et al. |
| 5,994,747 A | 11/1999 | Wu |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

OTHER PUBLICATIONS

Zhongyan Wang, et al., "An approach for nanometer trench and hole formation," Optical Microlithography XXI, Proceedings of the SPIE, vol. 6924, pp. 692447-692447-8 (2008).

*Primary Examiner* — Tan X Dinh

(57) ABSTRACT

An HAMR NFT pin and main body structure comprising a pin material with high index of refraction and low absorption coefficient is disclosed. The disclosed NFT pin provides a comparable media absorption efficiency to the conventional Au pin while improving on overall NFT reliability. The protrusion of the NFT pin is reduced and overall life of the writer is prolonged. The main body may comprise any noble metal or metal alloy suitable for achieving optical resonance in an HAMR NFT. The cladding material may be selected such that its coefficient of thermal expansion closely matches the coefficient of thermal expansion of the pin material.

14 Claims, 8 Drawing Sheets

(56) References Cited

U.S. PATENT DOCUMENTS

| | | |
|---|---|---|
| 6,069,770 A | 5/2000 | Cui et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,428,715 B1 | 8/2002 | Abels et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |

(56) References Cited

U.S. PATENT DOCUMENTS

| | | |
|---|---|---|
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,746,877 B1 | 6/2004 | Hornik et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,857,937 B2 | 2/2005 | Bajorek |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,086,931 B2 | 8/2006 | Oyama et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,708 B2 | 12/2006 | Chhabra et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |

(56) References Cited

U.S. PATENT DOCUMENTS

| | | |
|---|---|---|
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,455,332 B2 | 11/2008 | Jose et al. |
| 7,461,447 B2 | 12/2008 | Tzeng et al. |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,770,285 B2 | 8/2010 | Bonhote et al. |
| 7,785,666 B1 | 8/2010 | Sun et al. |
| 7,791,839 B2 | 9/2010 | Olson et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,965,464 B2 | 6/2011 | Batra et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,014,101 B2 | 9/2011 | Shimazawa et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,031,561 B2 | 10/2011 | Hellwig et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,107,326 B1 | 1/2012 | Hirano et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,891 B2 | 8/2012 | Lee et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,286,329 B1 | 10/2012 | Zhao et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |

(56) References Cited

U.S. PATENT DOCUMENTS

| | | |
|---|---|---|
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,391,108 B2 | 3/2013 | Peng et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,530 B2 | 4/2013 | Gao et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,456,969 B1 | 6/2013 | Mooney et al. |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 * | 1/2014 | Wang et al. ............... 369/13.33 |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,711,662 B2 * | 4/2014 | Lee et al. ............... 369/13.33 |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 * | 6/2014 | Tanner et al. ............... 356/445 |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 2003/0137772 A1 | 7/2003 | Challener |
| 2005/0078565 A1 * | 4/2005 | Peng et al. ............... 369/13.32 |
| 2008/0068748 A1 | 3/2008 | Olson et al. |
| 2008/0151427 A1 * | 6/2008 | Poon et al. ............... 360/235.4 |
| 2010/0104768 A1 | 4/2010 | Xiao et al. |
| 2010/0123965 A1 * | 5/2010 | Lee et al. ............... 360/59 |
| 2010/0123967 A1 * | 5/2010 | Batra et al. ............... 360/59 |
| 2010/0165517 A1 | 7/2010 | Araki et al. |
| 2010/0214685 A1 | 8/2010 | Seigler et al. |
| 2010/0290157 A1 | 11/2010 | Zhang et al. |
| 2011/0086240 A1 | 4/2011 | Xiang et al. |
| 2011/0090588 A1 | 4/2011 | Gao et al. |
| 2011/0146060 A1 | 6/2011 | Han et al. |
| 2011/0205863 A1 | 8/2011 | Zhao et al. |

(56) References Cited

U.S. PATENT DOCUMENTS

| | | |
|---|---|---|
| 2011/0299080 A1* | 12/2011 | Peng .............................. 356/364 |
| 2012/0008229 A1 | 1/2012 | Zhou et al. |
| 2012/0045662 A1 | 2/2012 | Zou et al. |
| 2012/0111826 A1 | 5/2012 | Chen et al. |
| 2012/0140609 A1* | 6/2012 | Huang et al. .................. 369/101 |
| 2012/0162811 A1 | 6/2012 | Ishibashi et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0170332 A1* | 7/2013 | Gao et al. ................... 369/13.33 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

NEAR FIELD TRANSDUCER WITH HIGH REFRACTIVE INDEX PIN FOR HEAT ASSISTED MAGNETIC RECORDING

CROSS-REFERENCE TO RELATED APPLICATIONS

This application claims the benefit of U.S. Provisional Application Ser. No. 61/918,199, filed Dec. 19, 2013, which is incorporated herein by reference in its entirety.

BACKGROUND

Heat-assisted magnetic recording (HAMR) writers have been developed to meet the growing demand for improved magnetic disk drive data capacity. HAMR writers heat high-stability magnetic compounds to apply changes in magnetic orientation. These materials can store bits in a much smaller areas without being limited by the superparamagnetic effect. In this regard, HAMR writers are a promising solution for pushing the data areal density of a hard disk to 1 Tbit/in$^2$ and beyond.

One of the critical components of the HAMR is the Near-Field Transducer (NFT) which comprises an NFT pin and an NFT main body. The NFT focuses incoming light to a nano-sized highly concentrated optical spot and delivers enough energy through the NFT pin to the media to achieve HAMR writing. The NFT couples the light from a waveguide (WG) to a resonator (the main body portion), where the light wave excites a surface plasmon wave and becomes resonant. A node of the resonant light wave is aligned with the pin by turning the polarization of the NFT, for example, by adjusting two arms of the waveguide.

FIG. 1 illustrates the temperature distribution within the conventional NFT 100. A quadruple pole resonance is observed. Because the pin 101 takes the role to focus the resonant wave energy, it is the highest temperature component of the already hot NFT 100. In the conventional NFT 100, the temperature difference between the NFT pin 101 and NFT main body 102 can be as high as 100 K. The conventional NFT comprises a noble metal or metal alloy in the resonator portion (main body) 102 and pin portion 101. Generally, gold (Au) or silver (Ag) are used. A noble metal is one of the few known options for achieving optical resonance in the visible light range. However, noble metals such as gold have a high thermal conductivity. The very high temperature of the conventional NFT noble metal pin 101, in addition to reducing its life span, causes other problems.

As illustrated in FIG. 2, the conventional NFT pin 101 significantly protrudes because of the high mismatch between the coefficient of thermal expansion (CTE) of the pin 101 and the surrounding cladding material. The conventional NFT pin with Au-pin and SiO2 cladding material, for example, typically has a CTE of 14.2 ppm/K for the Au pin and a CTE of 0.8 ppm/K for the surrounding SiO2 cladding material. Scanning electron microscope (SEM) image 200 illustrates one example view of the protrusion. Atomic force microscope (AFM) image 210 illustrates another view of the protrusion. This protrusion can be as high as 10 nm. The protruding pin may break the thin layer of carbon overcoat (~1-2 nm) on the ABS plane protecting the slider. This leads to burnishing of the magnetic writer against the media and significantly shortens the pin's lifespan. Eventually, the head-disk-interface is spoiled, and the driver loses function. Accordingly, it is desirable to manufacture an HAMR with NFT that does not exhibit this property.

BRIEF DESCRIPTION OF THE DRAWINGS

The present application is illustrated by way of example, and not limitation, in the figures of the accompanying drawings in which.

DETAILED DESCRIPTION

In the following description, numerous specific details are set forth to provide a thorough understanding of various embodiment of the present disclosure. It will be apparent to one skilled in the art, however, that these specific details need not be employed to practice various embodiments of the present disclosure. In other instances, well known components or methods have not been described in detail to avoid unnecessarily obscuring various embodiments of the present disclosure.

In accordance with the present disclosure, an HAMR NFT with a high refractive index and low absorption coefficient pin material is disclosed. In some embodiments, the NFT main body, which serves as a resonator, comprises Au, an Au Alloy, or other noble metal. In some embodiments, the CTE of the pin's surrounding cladding material may be matched to the pin's CTE. The disclosed HAMR NFT provides the benefit of a more optically, thermally, and mechanically reliable NFT with stable performance and prolonged lifetime in comparison to the conventional NFT.

Figure 1:
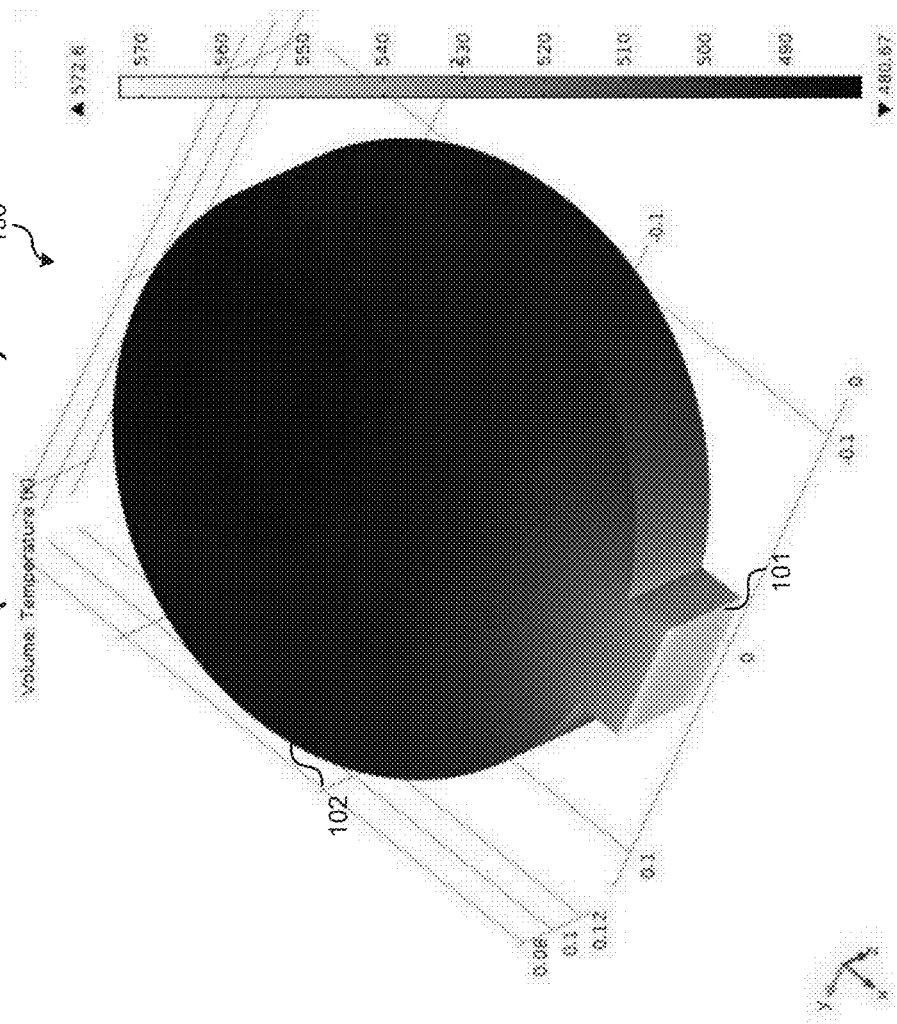
FIG. 1 is a thermal model illustrating the typical temperature distribution within the conventional NFT.
Figure 2:
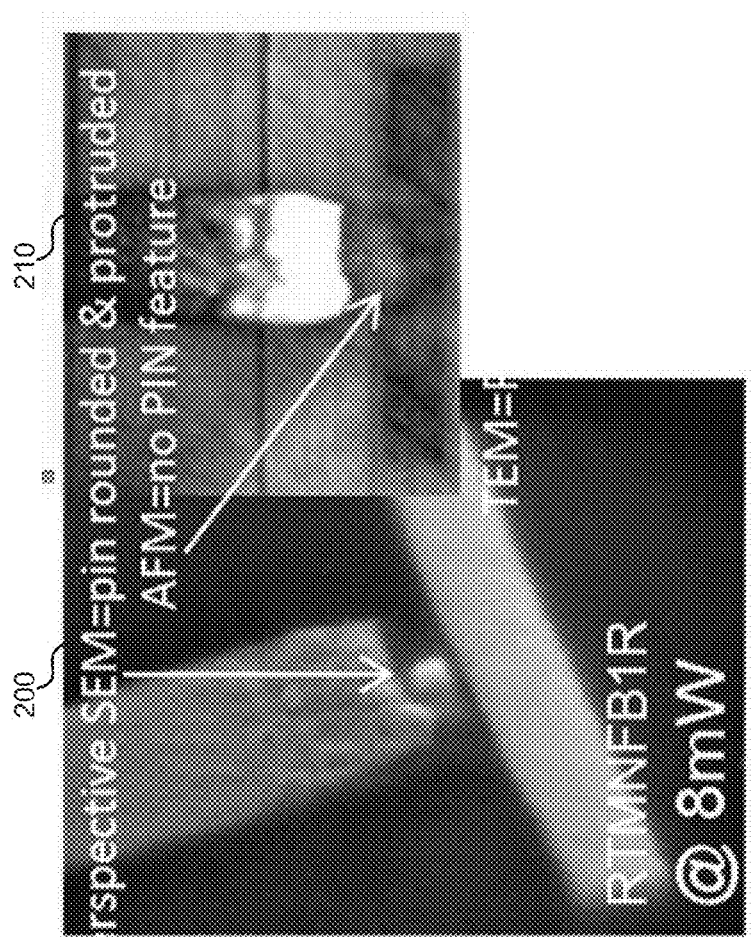
FIG. 2 includes SEM and AFM images illustrating the conventional NFT pin protrusion during heating.
Figure 3A:
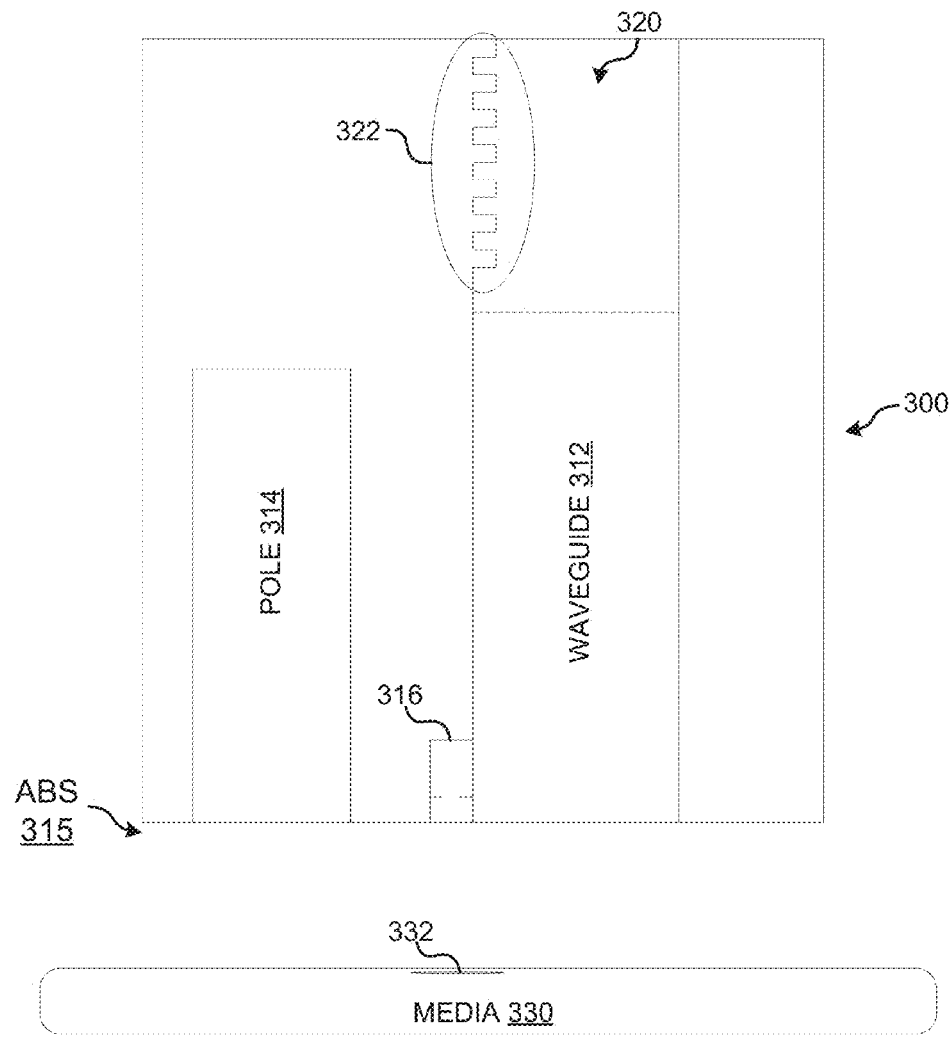
FIGS. 3A-3B illustrate an exemplary HAMR head that may be manufactured in accordance with embodiments of the present disclosure.
Figure 3B:
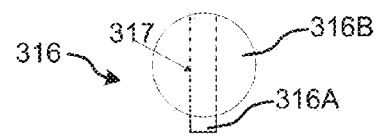

FIG. 3A illustrates a cross-sectional view of an exemplary HAMR head 300 that may be manufactured in accordance with embodiments of the present disclosure. HAMR head 300 may comprise a waveguide 312, a pole 314, a near-field transducer (NFT) 316, a grating 320, and a light (e.g. laser) spot 322 on the grating 320. FIG. 3B is a top view of NFT 316. NFT 316 includes a main body portion 316B and a pin portion 316A. Main body portion 316B may be shaped as a circle, a square, or another shape. The light or light energy from light spot 322 on grating 320 is coupled to waveguide 312, which guides the light energy to NFT 316 near air-bearing surface (ABS) 315. The main body portion of NFT 316 collects light energy from waveguide 312 and radiates it through the pin to media 330 on spot 332 to elevate the temperature of media 330 and reduce coercivity and change the magnetization of the media. HAMR 300 may then write data to the heated region of recording media 330 by energizing pole 314.

Figure 4A:
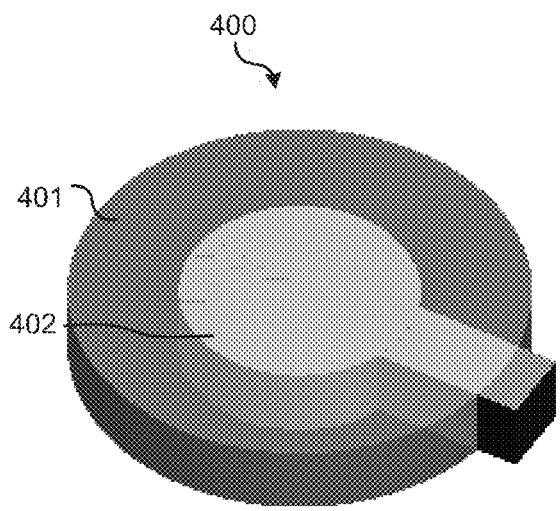
FIGS. 4A-4C illustrate three exemplary implementations of an NFT structure.
Figure 4B:
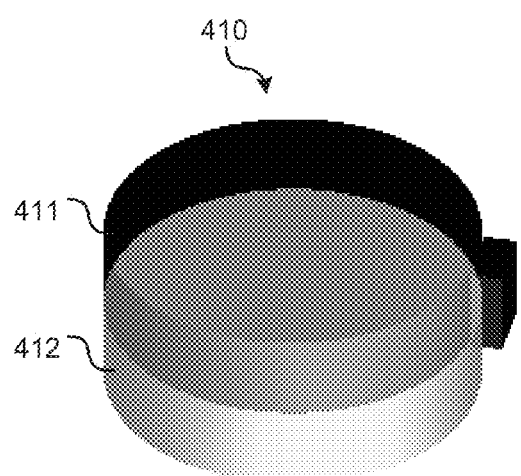
Figure 4C:
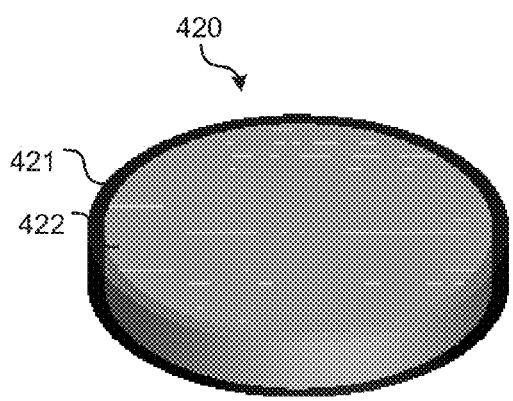
Figure 5A:
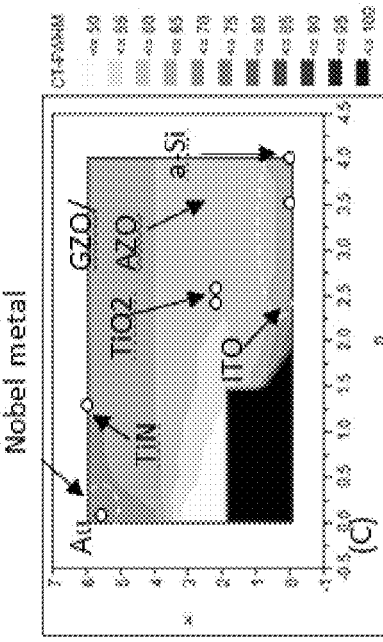
FIG. 5A is a thermal model illustrating the normalized media absorption efficiency with respect to the NFT with an Au pin.
Figure 5C:
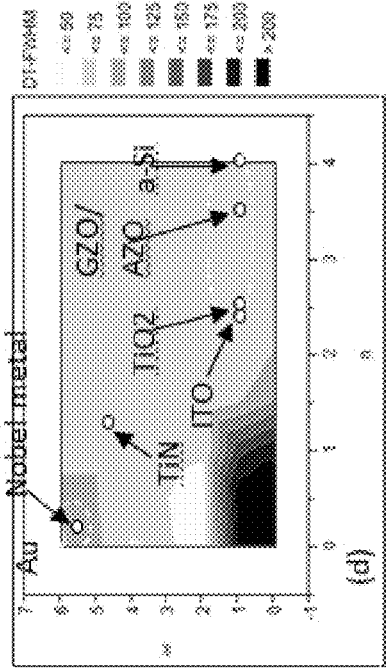
FIG. 5C is a thermal model illustrating the cross track full width half maximum spot size in the middle of the recording layer of a recording media.
Figure 5B:
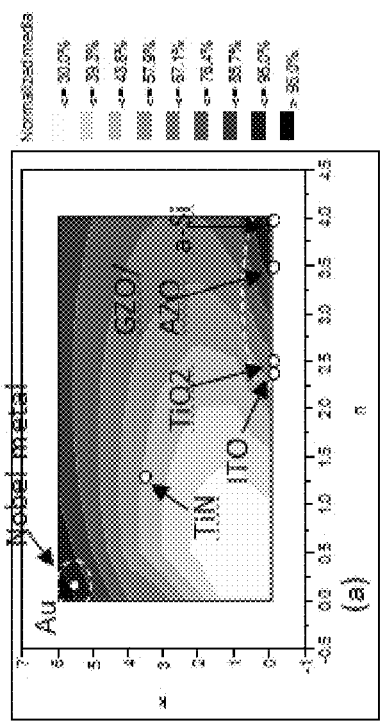
FIG. 5B is a thermal model illustrating the normalized NFT absorption efficiency with respect to the counterpart of the NFT with Au pin.
Figure 5D:
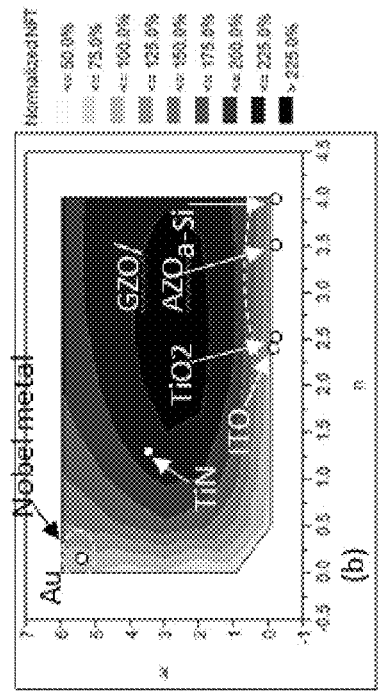
FIG. 5D is a thermal model illustrating the down track full width half maximum spot size in the middle of the recording layer of a recording media.

In some embodiments, the main body of the NFT structure may be modified to protect the NFT main body. FIGS. 4A-4C illustrate three exemplary alternative embodiments. In FIG. 4A, NFT 400 comprises a noble metal or alloy 401 (e.g. Au) that encases a central part 402 of the NFT. The noble metal 401 becomes a ring surrounding the main body to sustain the resonance wave. In FIG. 4B, a high n (n referring to the optical index of refraction of the material) main body and high n pin (together 411) are manufactured on top of a noble metal or alloy (e.g. Au) main body 412 to create NFT structure 410. In this embodiment, the energy is delivered through the high n pin of 411. This provides the benefit of encapsulating the noble metal main body, thereby eliminating the risk of the pin's protrusion. In FIG. 4C, NFT 420 comprises a high n disk 421 encapsulating a noble metal or alloy main body 422. In this embodiment, the resonant energy inside the main body 422 is delivered to the media by autofocusing.

Pin 316A materials that maintain desired NFT performance may be identified by mapping the material refractive index (n) and absorption coefficient (k) versus the media absorption efficiency. FIGS. 5A-5D are thermal models illustrating (A) the normalized media 330 absorption efficiency with respect to the NFT with Au pin; (B) the normalized NFT 316 absorption efficiency with respect to the counterpart of the NFT with Au pin; (C) the CT-FWHM (cross track full width half maximum) spot size (nm) in the middle of the recording layer of media 330; and (D) the DT-FWHM (down track full width half maximum) spot size (nm) in the middle of the recording layer of media 330.

As illustrated in FIGS. 5A-5D besides the low n high k materials (e.g. Au) used in the conventional NFT, high n low k materials (e.g., amorphous silicon, aluminum-doped zinc oxide, gallium zinc oxide, titanium dioxide, indium tin oxide) exhibit desirable performance properties such as high media absorption efficiency, high NFT absorption efficiency, and smaller FWHM spot sizes. These thermal models illustrate that the temperature field intensity is better confined (concentrated at the center) in the recording layer of media 330 in the n=4, k=0 case versus the conventional Au pin case. This provides the benefit of removing the uncertainty associated with Magnetic Thermal Offset (MTO), thereby improving the writing performance of the HAMR writer.

Table 1A, below, illustrates an exemplary list of various high n, low k materials (in addition to Au) that may be used to manufacture an NFT pin 316A in various embodiments of the present disclosure. The CTE of the materials is listed as well. Table 1B, below, illustrates two example materials (SiO2 and Ta2O5) that may be used as the surrounding cladding materials for the pin materials of Table 1A.

TABLE 1A

| Pin Material | | | | | |
|---|---|---|---|---|---|
| Pin Material | Full Name | N @ 830 nm | k @ 830 nm | CTE (ppm/k) | remarks |
| Ge | Germanium | 4.65 | 0.29 | 6 | |
| Si | Silicon | 3.67 | 0.005 | 2.6 | |
| a-Si | Amorphous silicon | 4.06 | 0.023 | 4.8 | |
| GaAs | Gallium arsenide | 3.67 | 0.08 | 3.5 | |
| AlSb | Aluminium antimonide | 3.54 | 0.0002 | 4.2 | |
| AlAs | Aluminium arsenide | 2.99 | 0 | 5.2 | |
| ITO | Indium tin oxide | 2.45 | 0 | 7.2 | Indium-Tin-Oxide |
| TiO2 | Titanium dioxide | 2.577 | 0 | 7.14 | |
| TeO2 | Tellurium dioxide | 2.256 | 0 | 19.0/6.0 | anisotropic |
| InP | Indium phosphide | 3.369 | 0 | | |
| GaN | Gallium nitride | 2.35 | 0 | 5.5 | |
| ZrO2 | Zirconium dioxide | 2.206 | 0 | 4.7/13.7 | anisotropic |
| AlN | Aluminum nitride | 2.137 | 0 | 4 | |
| Au | Gold | 0.2 | 5.4 | 14.2 | |

TABLE 1B

| Cladding Material | | | | |
|---|---|---|---|---|
| Cladding Material | Full Name | N @ 830 nm | k @ 830 nm | CTE (ppm/K) |
| SiO2 | Silicon dioxide | 1.45 | 0 | 0.8 |
| Ta2O5 | Tantalum pentoxide | 2.1 | 0 | 5.4 |

The conventional NFT comprises an Au pin and SiO2 cladding material. As shown in Tables 1A-1B, the CTE mismatch in the conventional NFT is greater than a factor of 15 (14.2 versus 0.8 CTE). In accordance with embodiments the present disclosure, the NFT pin is manufactured using any suitable high n and low k material. For example, in some embodiments the index of refraction of the pin material is greater than 2 and the absorption coefficient of the pin material is less than 1. In one specific embodiment, amorphous silicon is used as the pin material. In another embodiment, Gallium arsenide may be used as the pin material. In yet another embodiment, germanium may be used as the pin material.

In some embodiments, the cladding material may be chosen such that its CTE closely matches the CTE of the pin material. In some embodiments, the coefficient of thermal expansion of the pin material is less than ten times the coefficient of thermal expansion of a cladding material surrounding the pin. For example, in one embodiment Ta2O5 (CTE 5.4) is used as a cladding material for pin material comprising a-Si (CTE of 4.8). In one embodiment, the noble metal of the disk is gold and the pin material is at least one of the group comprising Si, a-Si, Ge, AZO, and GZO. In one embodiment the cladding material is Ta2O5. In further embodiments, the pin material and cladding material may be selected such that they have approximately the same CTE.

Figure 6A:
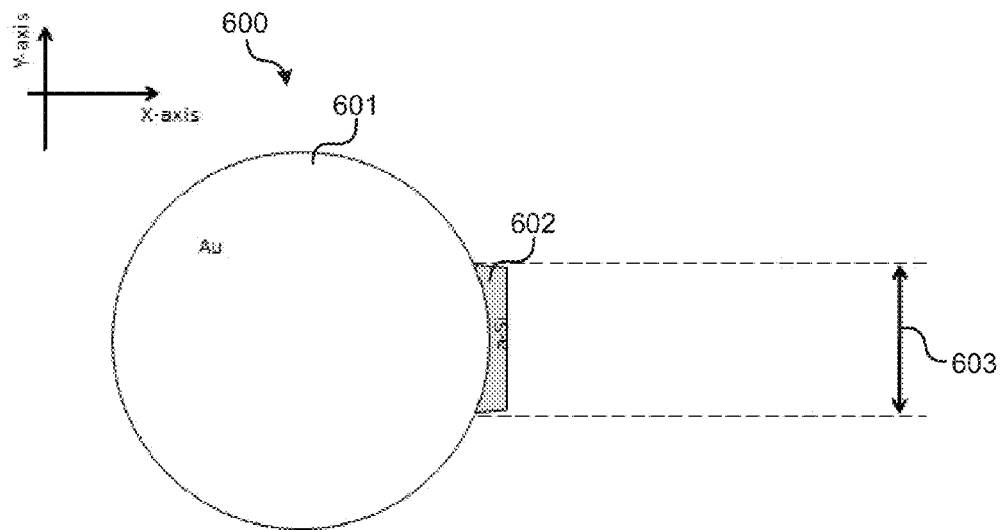
FIGS. 6A-6C illustrate exemplary implementations of an NFT comprising an amorphous silicon pin and gold or gold alloy main body.
Figure 6B:
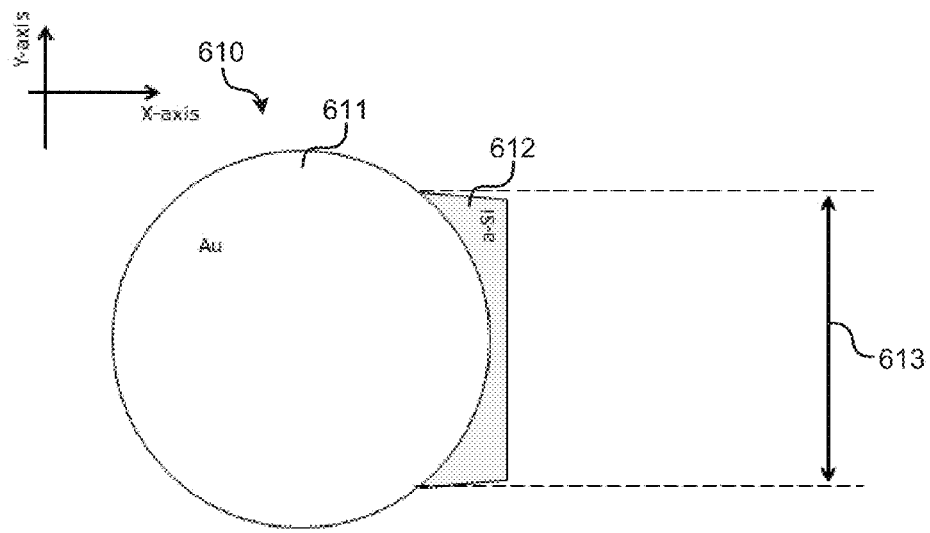
Figure 6C:
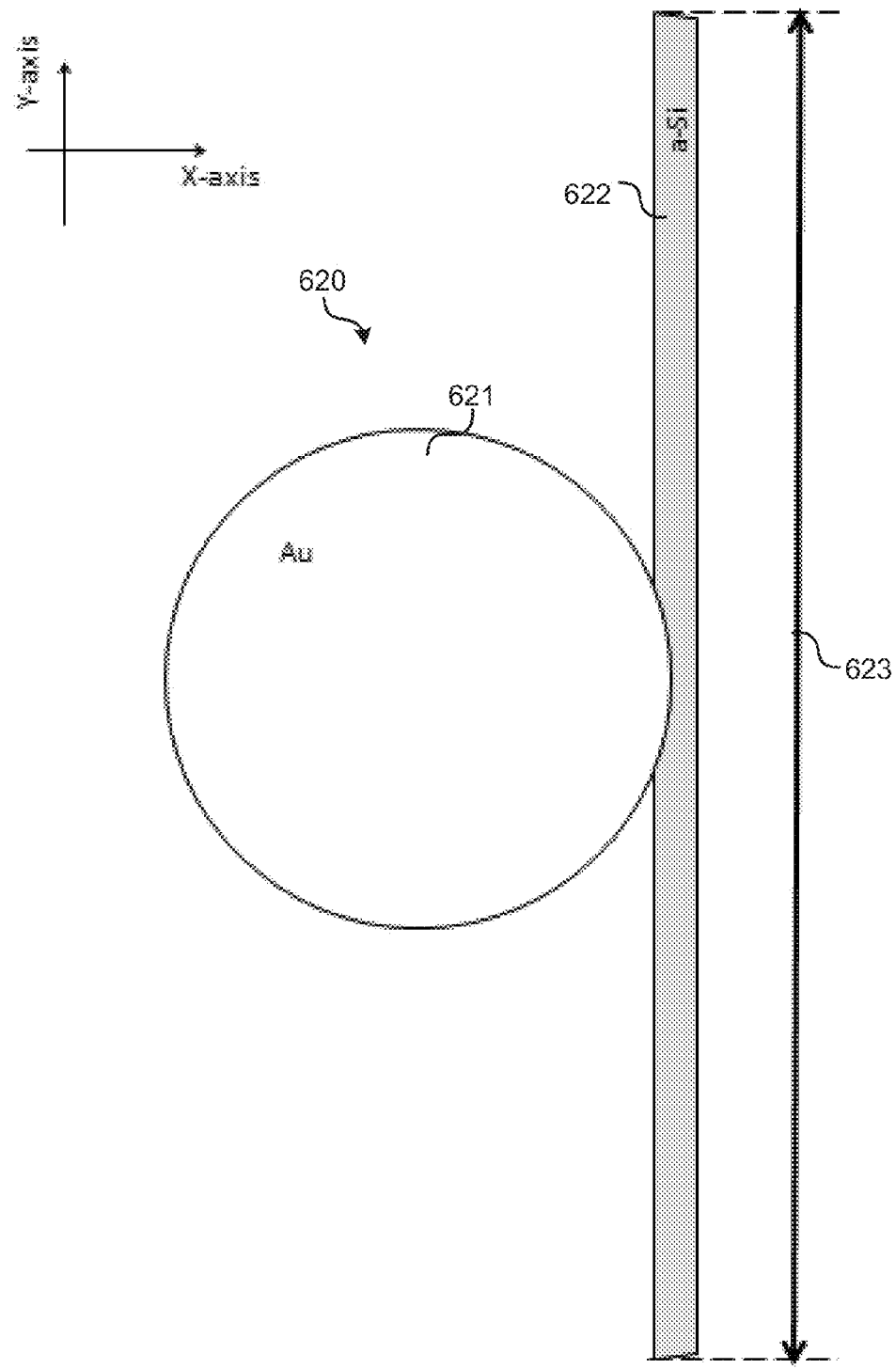

FIGS. 6A-6C illustrate three exemplary implementations of an NFT comprising an amorphous silicon (a-Si) pin (602, 612, or 622) and gold or gold alloy main body (601, 611, or 621). In these embodiments, the NFT comprises a diffusion barrier between the a-Si pin material and the gold or gold alloy main body. NFT 600 is patterned on a narrow wedge bar, thereby creating pin 602 with width 603. In one embodiment, the width 603 is between 70 and 120 nm. In one specific embodiment, the width 603 is approximately 90 nm. NFT 610 is patterned on a medium width wedge bar, thereby creating pin 612 with width 613. In one embodiment, the width 613 is between 150 and 250 nm. In one exemplary embodiment, the width 613 is approximately 180 nm. NFT 620 is patterned on a wide wedge bar, thereby creating pin 622 with width 623. In one embodiment, the width 623 is greater than 550 nm. In one specific embodiment, the width 623 is 800 nm. In one embodiment, main body 601, 611, or 621 is a disk. In one implementation of this embodiment, the diameter of the disk is approximately 230 nm.

Figure 7A:
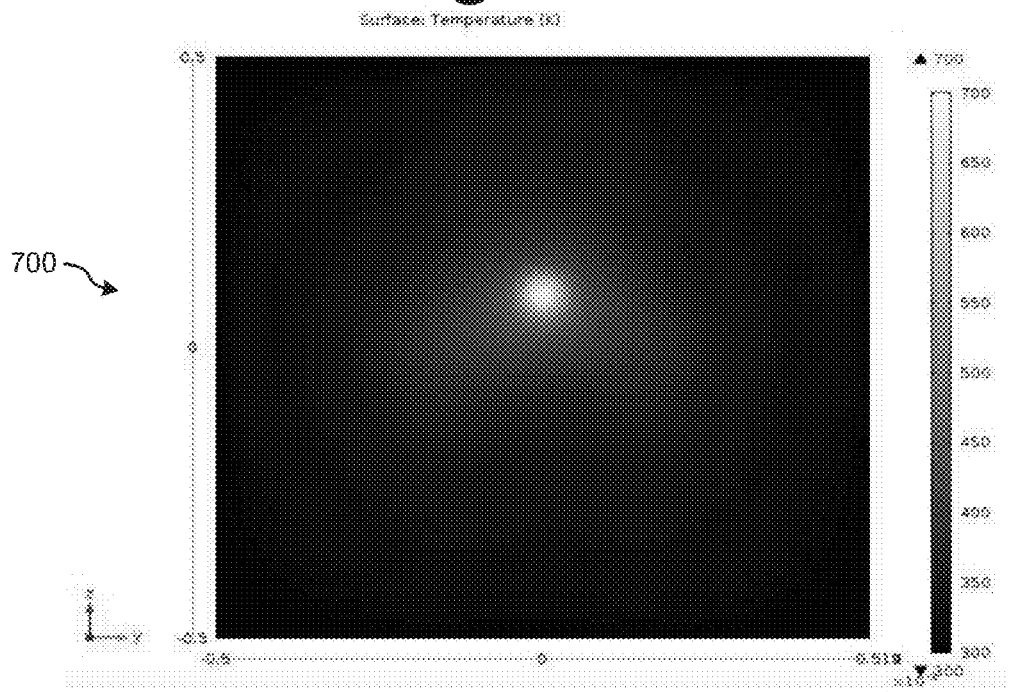
FIGS. 7A-7B are thermal models illustrating a two-dimensional temperature footprint in the recording layer of media when using high n materials.
Figure 7B:
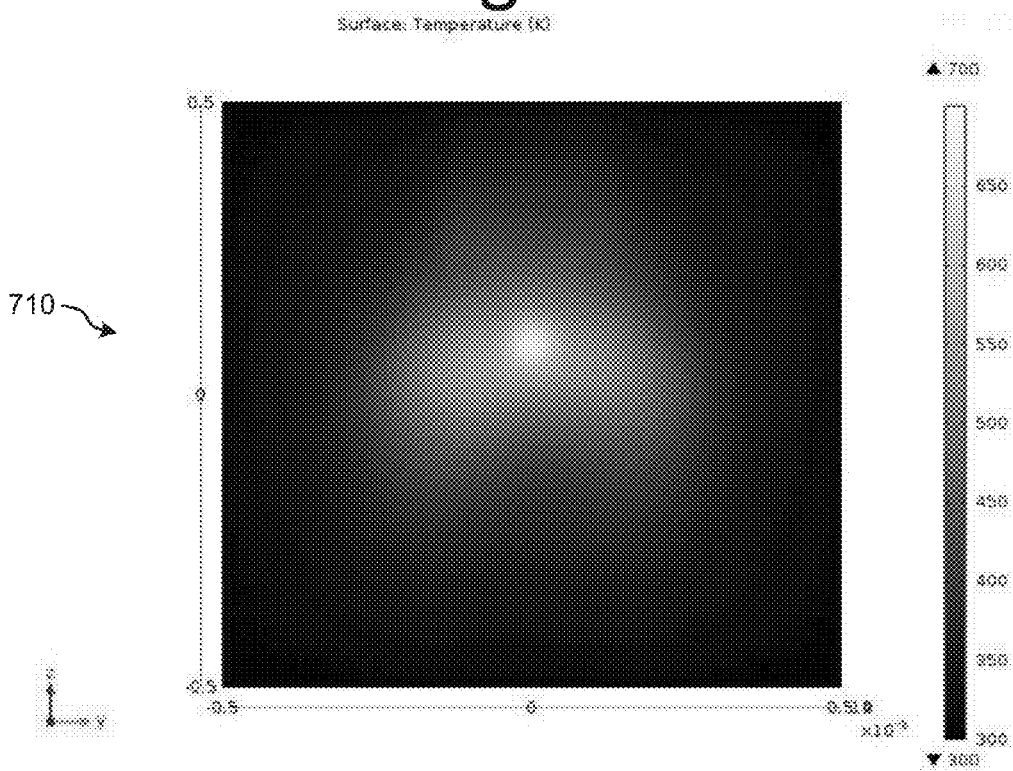

FIGS. 7A-7B are thermal models illustrating a two-dimensional temperature footprint in the recording layer of media 330 for the n=2, K=4.8 (700) and n=4, K=4.8 (710) cases. In these example models, the width of the modeled physical pin is 40 nm. The cross track isotherm footprint for the n=4, K=4.8 case is approximately 50 nm at 625K. This is less than the 75 nm footprint for the Au or Au alloy baseline case.

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense.

What is claimed is:

1. A heat-assisted magnetic recording (HAMR) head, comprising:
   at least one waveguide; and
   a near-field transducer (NFT) comprising:
      a main body;
      a pin, wherein the pin comprises a pin material with a high index of optical refraction and a low thermal absorption coefficient; and
      a cladding material surrounding the pin material
   wherein the index of optical refraction is greater than 2 and wherein the absorption coefficient is less than 1;
   wherein the pin material comprises at least one of: Ge, Si, a-Si, GaAs, AlSb, AZO, GZO, GaP, AlAs, ITO, $TiO_2$, $TeO_2$, GaN, $ZrO_2$, and AlN;
   wherein the main body comprises gold or a gold alloy;
   wherein the NFT comprises a second main body, wherein the second main body comprises a material with a high index of optical refraction, and wherein the second main body and the pin are manufactured on top of the gold or gold alloy main body.

2. The HAMR head of claim 1, wherein the pin material's coefficient of thermal expansion and the cladding material's coefficient of thermal expansion are within a factor of 10.

3. The HAMR head of claim 2, wherein the pin material's coefficient of thermal expansion and the cladding material's coefficient of thermal expansion are within a factor of 4.

4. The HAMR head of claim 3, wherein the pin material's coefficient of thermal expansion and the cladding material's coefficient of thermal expansion are approximately the same.

5. The HAMR head of claim 1, wherein the cladding material comprises at least one of $SiO_2$ or $Ta_2O_5$.

6. The HAMR head of claim 5, wherein the index of optical refraction is greater than 3.4.

7. The HAMR head of claim 5, wherein the pin material comprises a-Si and the cladding material comprises $Ta_2O_5$.

8. The HAMR head of claim 1, wherein a central part of the main body comprises a material with a high index of optical refraction.

9. The HAMR head of claim 1, wherein the pin encapsulates the main body.

10. A heat-assisted magnetic recording (HAMR) head, comprising:
    at least one waveguide; and
    a near-field transducer (NFT) comprising:
       a main body;
       a pin, wherein the pin comprises a pin material with a high index of optical refraction and a low thermal absorption coefficient; and
       a cladding material surrounding the in material
    wherein the index of optical refraction is greater than 2 and wherein the absorption coefficient is less than 1;
    wherein the pin material comprises at least one of: Ge, Si, a-Si, GaAs, AlSb, AZO, GZO, GaP, AlAs, ITO, $TiO_2$, $TeO_2$, GaN, $ZrO_2$, and AlN;
    wherein the main body comprises gold or a gold alloy;
    wherein the pin material comprises a-Si, and wherein the NFT comprises a diffusion barrier between the a-Si pin material and the gold or gold alloy main body.

11. A hard disk drive, comprising:
    a rotatable disk having a disk surface;
    a disk drive base;
    a spindle motor attached to the disk drive base and configured to support the disk for rotating the disk with respect to the disk drive base surface; and
    an HAMR head, comprising:
       at least one waveguide; and
       a near-field transducer (NFT) comprising:
          a main body;
          a pin, wherein the pin comprises a pin material with a high index of optical refraction and a low thermal absorption coefficient; and
          a second main body comprising a material with a high index of optical refraction, wherein the second main body and the pin are manufactured on top of the main body.

12. The hard disk drive of claim 11, wherein the pin material comprises at least one of Ge, Si, a-Si, GaAs, AlSb, AZO, GZO, GaP, AlAs, ITO, $TiO_2$, $TeO_2$, GaN, $ZrO_2$, or AlN.

13. A near-field transducer (NFT) comprising:
    a main body; and
    a pin, wherein the pin comprises a pin material with a high index of optical refraction and a low thermal absorption coefficient; and
    a second main body comprising a material with a high index of optical refraction, wherein the second main body and the pin are manufactured on top of the main body.

14. The NFT of claim 13, wherein the pin material comprises at least one of Ge, Si, a-Si, GaAs, AlSb, AZO, GZO, GaP, AlAs, ITO, $TiO_2$, $TeO_2$, GaN, $ZrO_2$, or AlN.

* * * * *